United States Patent
Tong et al.

(10) Patent No.: US 11,840,998 B2
(45) Date of Patent: Dec. 12, 2023

(54) HYDRAULIC TURBINE CAVITATION ACOUSTIC SIGNAL IDENTIFICATION METHOD BASED ON BIG DATA MACHINE LEARNING

(71) Applicant: Zhejiang University, Zhejiang (CN)

(72) Inventors: Zheming Tong, Zhejiang (CN); Jiage Xin, Zhejiang (CN); Shuiguang Tong, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/859,244

(22) Filed: Jul. 7, 2022

(65) Prior Publication Data

US 2023/0023931 A1 Jan. 26, 2023

(30) Foreign Application Priority Data

Jul. 8, 2021 (CN) .......................... 202110771367.3

(51) Int. Cl.
*F03B 11/00* (2006.01)
*G06F 18/2137* (2023.01)
*G06F 18/243* (2023.01)

(52) U.S. Cl.
CPC .......... *F03B 11/008* (2013.01); *F05B 2260/80* (2013.01); *F05B 2270/305* (2013.01);
(Continued)

(58) Field of Classification Search
CPC .......... F05B 2270/333; F05B 2270/334; F05B 2270/709; G06F 18/2137; G06F 18/24323
See application file for complete search history.

(56) References Cited

U.S. PATENT DOCUMENTS 6,637,267 B2 * 10/2003 Fiebelkorn .......... F16K 37/0083
73/659
9,324,037 B2 * 4/2016 Lösl ..................... G05B 23/021
(Continued)

FOREIGN PATENT DOCUMENTS

CN 109342018 A * 2/2019 ............ G01M 10/00
CN 109472288 A * 3/2019 ........... G06K 9/6232
(Continued)

OTHER PUBLICATIONS

Zhou, Y. et al. Turbine Cavitation State Recognition Based on BP Neural Network. 2019 International Conference on Robots & Intelligent System (ICRIS) (pp. 114-117). DOI: 10.1109/ICRIS.2019. 00037 (Year: 2019).*

*Primary Examiner* — Topaz L. Elliott

(57) ABSTRACT

The present invention provides a hydraulic turbine cavitation acoustic signal identification method based on big data machine learning. According to the method, time sequence clustering based on multiple operating conditions under the multi-output condition of the hydraulic turbine set is performed by utilizing an neural network, characteristic quantities of the hydraulic turbine set under a steady condition in a healthy state is screened; a random forest algorithm is introduced to perform feature screening of multiple measuring points under steady-state operation of the hydraulic turbine set, optimal feature measuring points and optimal feature subsets are extracted, finally a health state prediction model is constructed by using gated recurrent units; whether incipient cavitation is present in the equipment is judged. The present invention can effectively identify the occurrence of incipient cavitation in the hydraulic turbine set, reducing unnecessary shutdown of the equipment and prolonging the service life.

10 Claims, 4 Drawing Sheets

(52) U.S. Cl.
CPC ... *F05B 2270/333* (2013.01); *F05B 2270/404* (2013.01); *F05B 2270/709* (2013.01); *F05B 2270/80* (2013.01); *G06F 18/2137* (2023.01); *G06F 18/24323* (2023.01)

(56) References Cited

U.S. PATENT DOCUMENTS

| | | | |
|---|---|---|---|
| 2003/0019297 A1* | 1/2003 | Fiebelkorn | F16K 37/0083 73/587 |
| 2014/0046881 A1* | 2/2014 | Losl | G06N 20/00 706/14 |

FOREIGN PATENT DOCUMENTS

| | | | | |
|---|---|---|---|---|
| CN | 113076975 A | * | 7/2021 | ........... G06K 9/6256 |
| CN | 115730241 A | * | 3/2023 | ........... G06K 9/6256 |
| JP | 2019185580 A | * | 10/2019 | ........... G06K 9/6232 |

\* cited by examiner

HYDRAULIC TURBINE CAVITATION ACOUSTIC SIGNAL IDENTIFICATION METHOD BASED ON BIG DATA MACHINE LEARNING

TECHNICAL FIELD

The present invention relates to the field of fault recognition and early warning, in particular to a hydraulic turbine cavitation acoustic signal identification method based on big data and machine learning.

BACKGROUND

Hydropower is an important part of the global energy strategy. Among renewable resources, hydropower is the highest in electric energy production, accounting for 16-17% of the world's gross generation and about 80% of the world's renewable electricity. The hydraulic turbine generator set is the core equipment of a hydropower station, and the steady operation of the set is of great significance to avoid potential safety hazards and improve the economic benefits of power generation enterprises. Cavitation is a common failure phenomenon in hydraulic machinery. The existence of cavitation will reduce the set efficiency and increase the set vibration and blade wear, resulting in greatly reduced working life of the hydraulic turbine set and causing huge economic losses.

There is usually a transitional development period of deterioration from a steady state to cavitation. Conventional cavitation state detection technologies usually require complicated physical models or rely on the experiential knowledge of experts. Moreover, there are problems such as a few monitoring points, and lack of systematicness and comprehensiveness. Diagnosis is usually made when the monitoring site data exceed the fault alarm threshold, so the prediction & diagnosis and regulation & maintenance of incipient cavitation cannot be performed timely in the early stage.

With the rise of artificial intelligence represented by neural networks, the nonlinear parameters and signals can be well fitted by the neural network and applied in early fault diagnosis and warning. However, how to use the neural network to identify and capture the cavitation signals of a hydraulic turbine is still an urgent technical problem.

SUMMARY

The present invention is intended to solve the problems in the prior art, and provides a hydraulic turbine cavitation acoustic signal identification method based on big data learning, which can effectively identify the occurrence of incipient cavitation in the hydraulic turbine set and timely provide warning for maintenance, thereby reducing unnecessary shutdown of the equipment and prolonging the service life.

To achieve the aforesaid purposes, the present invention adopts the following technical solutions:

A hydraulic turbine cavitation acoustic signal identification method based on big data learning includes the following steps:

S1, obtaining latest acoustic signal time sequence data of each measuring point in real time through measuring points arranged on a hydraulic turbine set, and partitioning the acoustic signal time sequence data of each measuring point into multiple normalized acoustic signal subsequences, wherein a latest recorded acoustic signal subsequence of each measuring point is used as a real-time signal subsequence;

S2, inputting the acoustic signal subsequences of all measuring points obtained in S1 into a self-organizing maps (SOM) neural network, clustering the acoustic signal subsequences into multiple clusters according to the corresponding operating condition of the hydraulic turbine set, and then dividing the clusters into a steady-state cluster and an unsteady-state cluster according to a signal fluctuation degree of the acoustic signal subsequences in each cluster;

S3, traversing distribution of the real-time signal subsequences of all measuring points in the clusters; if a number of the real-time signal subsequences contained in the steady-state cluster is not lower than a minimum number threshold, it is judged that the hydraulic turbine is in a steady condition and incipient cavitation warning proceeds according to S4-S8; otherwise, the current incipient cavitation warning process is interrupted;

S4, performing feature screening on the real-time signal subsequences contained in the steady-state cluster by a RF algorithm, and extracting optimal feature measuring points which can sensitively reflect changes in the operating condition of the hydraulic turbine set and optimal feature subsets of each optimal feature measuring point;

S5, normalizing the optimal feature subsets of each optimal feature measuring point and calculating information entropy, and with the information entropy as an input, predicting a future trend of the hydraulic turbine set in a healthy state by using a health state prediction model constructed based on multilayer gate recurrent units (GRUs) to obtain predictive information entropy of the acoustic signal of each optimal feature measuring point in the next predictive step;

S6, obtaining acoustic signal time sequence data actually acquired from each optimal feature measuring point on the hydraulic turbine set in the next predictive step and calculating actual information entropy, and calculating a dynamic tolerance of each optimal feature measuring point from the predictive information entropy and the actual information entropy;

S7, based on the current output condition of the hydraulic turbine set, obtaining acoustic signal information entropy (with incipient cavitation present) of the hydraulic turbine set in the next predictive step through prediction using the pre-constructed SOM network, and calculating a dynamic tolerance alarm threshold of each optimal feature measuring point from the predictive information entropy and the acoustic signal information entropy (with incipient cavitation present); and S8, comparing a sum of the dynamic tolerances of all optimal feature measuring points with a sum of the dynamic tolerance alarm thresholds based on a threshold method, and judging whether the incipient cavitation occurs to the hydraulic turbine set; if yes, an incipient cavitation warning is given; otherwise, no incipient cavitation warning is given.

Preferably, in S1, the method of partitioning the acoustic signal time sequence data of each measuring point into multiple acoustic signal subsequences includes the following steps:

S11, performing fixed-step sliding through a fixed-sized time window on the acoustic signal time sequence data of each measuring point, and extracting an acoustic signal subsequence from the time window every time one step is slided by; and S12, normalizing each acoustic signal subsequence extracted in S11 to obtain a finally outputted acoustic signal subsequence.

Preferably, the implementation method of S2 includes the following steps:

S21, inputting the acoustic signal subsequences of all measuring points obtained in S1 as an input layer of the SOM neural network, so that the inputted acoustic signal subsequences are divided into different clusters through unsupervised learning clustering; and S22, for each cluster clustered in S21, calculating multiple statistical values of data points in each acoustic signal subsequence, and then calculating a deviation of each statistical value of different acoustic signal subsequences in the same cluster; if the deviation of each statistical value corresponding to one cluster is less than the respective deviation threshold, such cluster is marked as a steady-state cluster; otherwise, such cluster is marked as an unsteady-state cluster.

Preferably, the multiple statistical values include the mean value, maximum value, minimum value and median of the data points in the acoustic signal subsequences, and the deviation is a variance.

Preferably, the implementation method of S4 includes the following steps:

S41, performing a first disturbance on each real-time signal subsequence contained in the steady-state cluster based on a RF algorithm, and calculating a feature importance index $\Psi_k$ of each corresponding measuring point according to the results before and after the disturbance, wherein a calculation formula is as follows:

$$\Psi_k = \frac{1}{B}\sum_{b=1}^{B}\left(R_b^{oob} - R_{bk}^{oob}\right)$$

where B represents a total number of the real-time signal subsequences contained in the steady-state cluster, $R_b^{oob}$, represents a number of correctly classified out-of-bag (OOB) data of a decision-making tree before the first disturbance is performed on the bth real-time signal subsequence, and $R_{bk}^{oob}$ represents a number of correctly classified OOB data of a decision-making tree after the first disturbance is performed on the bth real-time signal subsequence;

S42, based on the feature importance index of each measuring point obtained in S41, screening optimal feature measuring points which can sensitively reflect changes in the operating condition of the hydraulic turbine set from the measuring points corresponding to all real-time signal subsequences in the steady-state cluster;

S43, for each optimal feature measuring point, performing empirical mode decomposition (EMD) on a corresponding real-time signal subsequence to obtain an equal number of feature subsets, and then performing a second disturbance on each feature subset based on the RF algorithm, and calculating a feature importance index $\Psi_{k1}$ of each corresponding feature subset according to the results before and after the disturbance, wherein a calculation formula is as follows:

$$\Psi_{k1} = \frac{1}{B'}\sum_{b'=1}^{B'}\left(R_{b'}^{\prime oob} - R_{b'k}^{\prime oob}\right)$$

where B' represents a number of feature subsets of each optimal feature measuring point, $R_{b'}^{\prime oob}$ represents a number of correctly classified OOB data of a decision-making tree before the second disturbance is performed on the b'th feature subset, and $R_{b'k}^{\prime oob}$ represents a number of correctly classified OOB data of a decision-making tree after the second disturbance is performed on the b'th feature subset; and S44, based on the feature importance index of each feature subset obtained in S43, screening an equal number of optimal feature subsets which can sensitively reflect changes in the operating condition of the hydraulic turbine set from the feature subsets of each optimal feature measuring point.

Preferably, the implementation method of S5 includes the following steps:

S51, for any pth optimal feature measuring point, combining its optimal feature subsets to form a signal sequence $X'=[x_{p,1}, x_{p,2}, \ldots, x_{p,r}, \ldots, X_{p,R}]$ with a length R after the feature extraction, normalizing the signal sequence X' to obtain a signal sequence $Y'=[y'_{p,1}, y'_{p,2}, \ldots, y'_{p,R}]$, and then calculating information entropy $y_{p,R}$ of the normalized signal sequence Y':

$$y_{p,R} = -\sum_{r=1}^{R} y'_{p,r} lg(y'_{p,r})$$

S52, constructing and training a health state prediction model composed of multilayer GRUs, wherein each GRU is corresponding to an optimal feature measuring point, configured to predict a future trend of acoustic signal sequence information entropy at a corresponding optimal feature measuring point when the hydraulic turbine set is in a healthy condition without cavitation; and S53, inputting the information entropy $y_{p,R}$ of each optimal feature measuring point calculated in S51 into the corresponding GRU in the health state prediction model successively, wherein the GRU outputs predictive information entropy $y_{p,h}$ of the acoustic signal of the corresponding optimal feature measuring point in the next time step h to be predicted.

Preferably, in S6, for any pth optimal feature measuring point, its dynamic tolerance $\Delta y_{p,h}$ is calculated by the following formula:

$$\Delta y_{p,h} = \left|\frac{\hat{y}_{p,h} - y_{p,h}}{y_{p,h}}\right| \times 100\%$$

where $\hat{y}_{p,h}$ represents actual information entropy of the acoustic signal time sequence data actually acquired from the pth optimal feature measuring point in the time step h.

Preferably, the implementation method of S7 includes the following steps:

S71, based on the SOM network, constructing a multi-dimensional mapping network between the acoustic signal information entropy of the measuring points and the cavitation state of the hydraulic turbine set under different output conditions;

S72, determining the current output condition of the hydraulic turbine set, and then predicting acoustic signal information entropy $\bar{y}_{p,h}$ (with incipient cavitation present) of the optimal feature measuring points in the hydraulic turbine set in the time step h by using the multi-dimensional mapping network; and S73, calculating a dynamic tolerance alarm threshold $\Delta \overline{y}_{p,h}$ according to the acoustic signal information entropy $\overline{y}_{p,h}$ and the predictive information entropy $y_{p,h}$ of each optimal feature measuring point, wherein a calculation formula is as follows:

$$\Delta \overline{y}_{p,h} = \left| \frac{\overline{y}_{p,h} - y_{p,h}}{y_{p,h}} \right| \times 100\%.$$

Preferably, in S8, a comparative analysis is performed by an analytical method of stacked area chart.

Preferably, S1-S8 proceed iteratively according to the set step interval when the hydraulic turbine set is operating.

Compared with the prior art, the present invention features the following beneficial effects:

Based on the SOM neural network subject to big data training and GRU, the real-time detection on acoustic signals of the hydraulic turbine set under a steady and healthy condition is realized. By extracting the state feature, the future short-term steady condition information can be predicted and outputted in advance. After the predictive information is compared with the real information, the occurrence of incipient cavitation in the hydroelectric equipment in operation can be found timely. The present invention can reduce the blindness of hydraulic turbine set repair, and improve the safety operation capability of the set.

DETAILED DESCRIPTION OF THE EMBODIMENTS

The present invention will be further described below in combination with the accompanying drawings and specific embodiments.

In the present invention, based on the characteristics that a hydraulic turbine set will emit an abnormal acoustic signal when cavitation occurs, the noninvasively real-time warning for incipient cavitation is realized by monitoring the acoustic signals from different measuring point positions of the hydraulic turbine generator set. The solution adopted by the present invention includes the following general process: first the acoustic signal data preprocessing is performed, clustering analysis is performed by using a Self-Organizing Maps (SOM) neural network, the operating state of the hydraulic turbine set is accurately identified, and a RF algorithm is introduced to perform feature selection in steady state and extract the highly targeted feature signals; the future vibration development of each monitoring point of the hydraulic turbine set is predicted by using the GRU, a dynamic tolerance model is constructed to compare the dynamic differences between the actual data and the predicted data in real time continuously, whether incipient cavitation trend occurs to the hydraulic turbine generator set is monitored by coupling the actual deviation gaps of multiple measuring points, and the cavitation in the working hydroelectric equipment is found timely, so as to take maintenance measures properly. The specific implementation steps of the present invention will be described below for ease of understanding.

Figure 1:
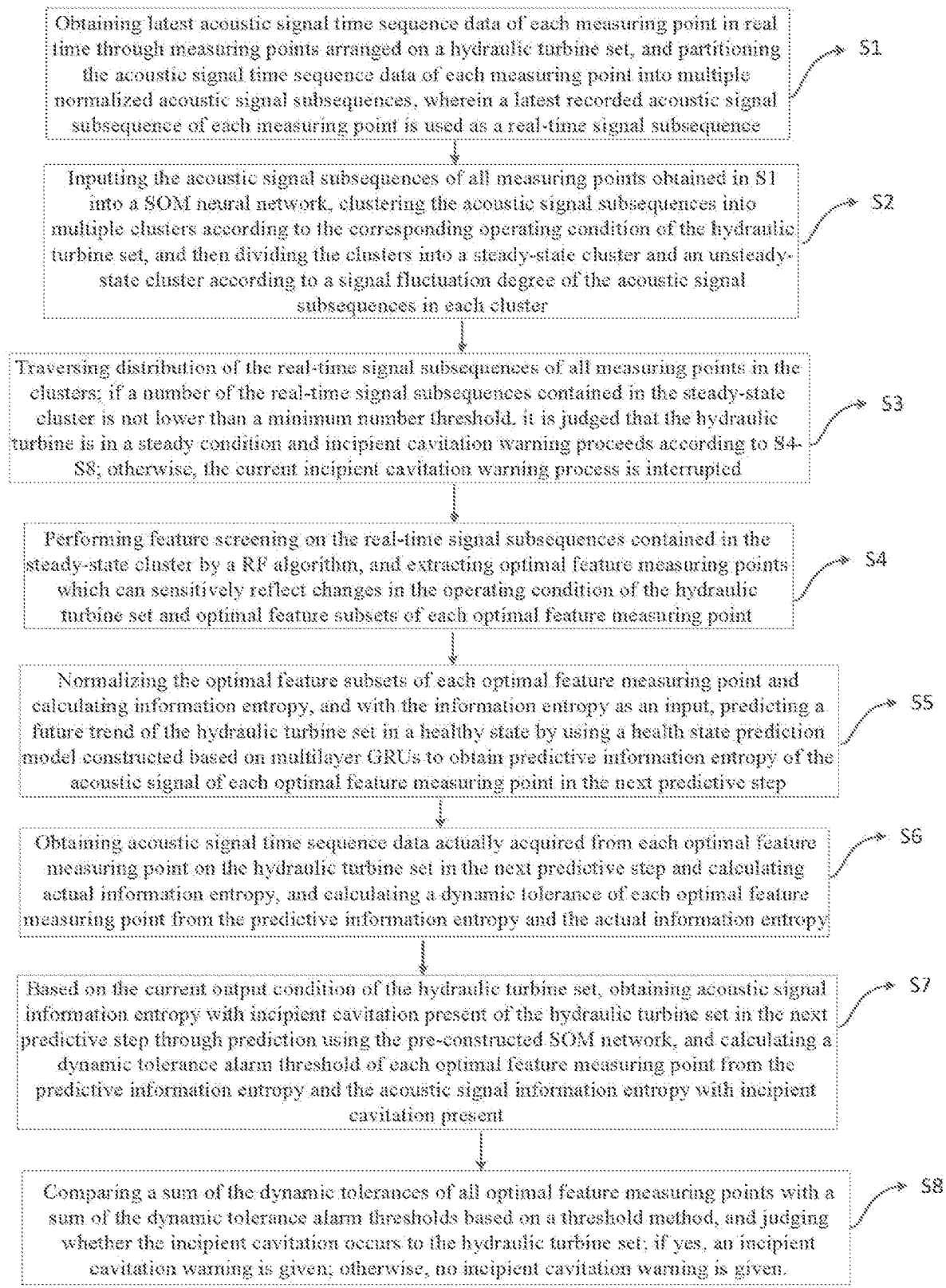
FIG. 1 is a flow chart of the hydraulic turbine cavitation acoustic signal identification method of the present invention.
Figure 2:
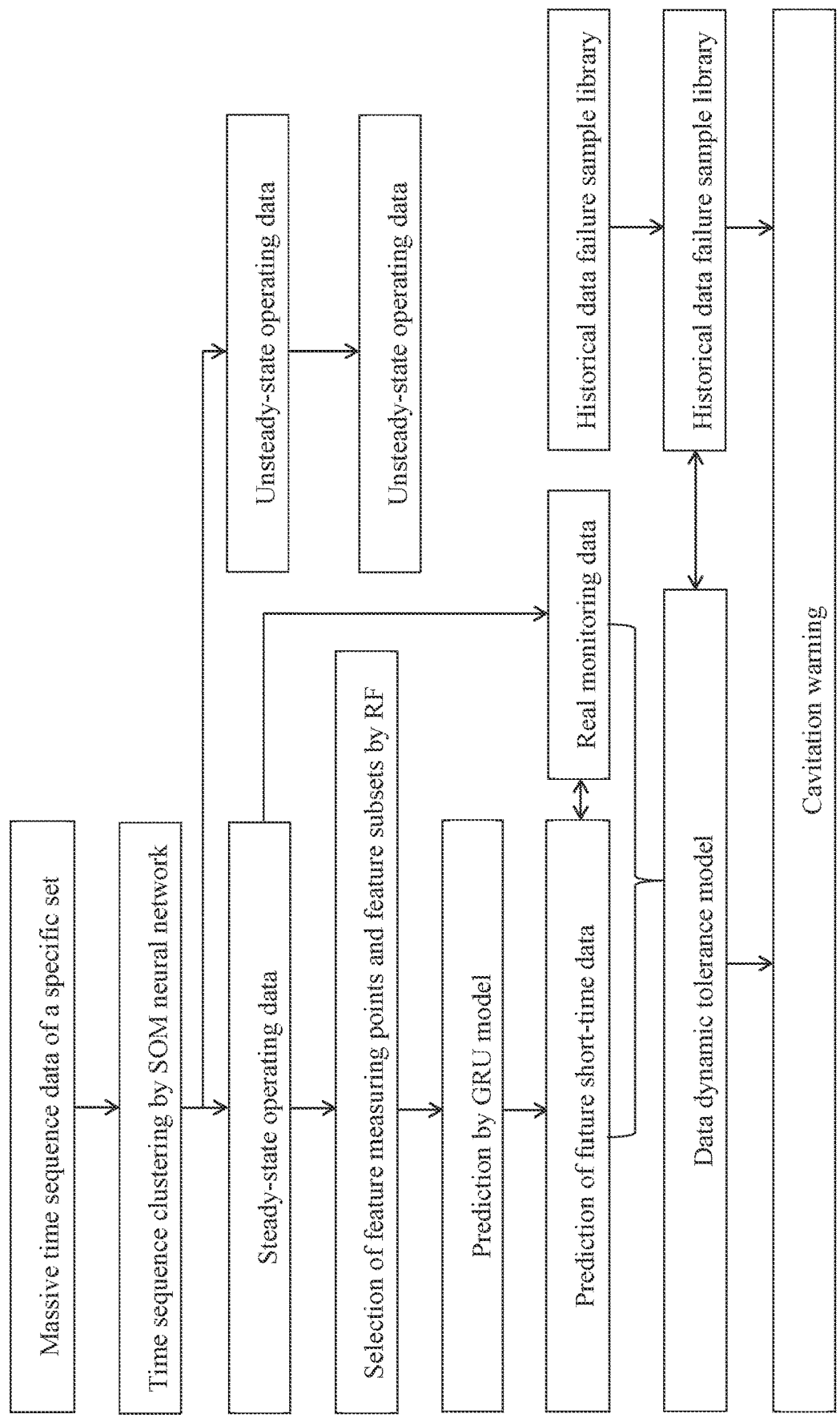
FIG. 2 is a flow chart of the cavitation warning of the present invention.

As shown in FIG. 1, in a preferred embodiment of the present invention, a hydraulic turbine cavitation acoustic signal identification method based on big data learning is provide, as shown in S1-S8. The basic process to realize cavitation warning by identification of the overall hydraulic turbine cavitation acoustic signals is as shown in FIG. 2. The steps are specifically described below.

S1, the latest acoustic signal time sequence data of each measuring point are obtained in real time through measuring points arranged on a hydraulic turbine set, and the acoustic signal time sequence data of each measuring point are partitioned into multiple normalized acoustic signal subsequences, wherein a latest recorded acoustic signal subsequence of each measuring point is used as a real-time signal subsequence.

It should be noted that the acoustic signal measuring points on the hydraulic turbine set need to be arranged in advance, and the specific arrangement positions can depend on experts' experience. In the operation process of the hydraulic turbine set, each measuring point position will uninterruptedly acquire acoustic signals emitted by the hydraulic turbine set according to a set sampling frequency through a sensor, and store such signals in a form of time sequence, thereby forming massive time data. Moreover, in the operation process of the hydraulic turbine set, the incipient cavitation warning process is iterative at a set step interval, namely, the newly generated data are analyzed at a certain step interval, realizing the incipient cavitation warning and timely finding a sign of cavitation from the acoustic signals. Therefore, in each round of incipient cavitation warning, the acoustic signal time sequence data acquired from each measuring point should contain the latest recorded data.

In such example, the acoustic signal time sequence data of each measuring point can be partitioned into multiple acoustic signal subsequences by setting a time window. The specific method includes the following steps:

S11, fixed-step sliding is performed by a fixed-sized time window on the acoustic signal time sequence data of each measuring point, and an acoustic signal subsequence is extracted from the time window every time one step is slided by.

It is assumed that the acoustic signal time sequence data of any ith measuring point are denoted as $x_i=[x_{i,1}, x_{i,2}, \ldots, x_{i,m}, \ldots, x_{i,M}]$, wherein M represents a length of the acoustic signal time sequence data, $x_{i,m}$ represents the mth sampling point data in the acoustic signal time sequence data of the ith measuring point, i=1, 2, 3, . . . , I, and I represents a total number of measuring points on the hydraulic turbine set. During partitioning and extraction of $x_i$, sliding can be performed at a step length k through a time window with a length w, wherein the first acoustic signal subsequence $\theta_1=[x_{i,1}, x_{i,2}, \ldots, x_{i,w}]$ is obtained by the first step, and so on, to form a sample data set $\varphi=<\theta_1, \theta_2, \ldots, \theta_C>$ composed of a series of acoustic signal subsequences, where C represents a total number of acoustic signal subsequences extracted from an acoustic signal time sequence datum.

A latest recorded acoustic signal subsequence $\theta_C$ in each measuring point is denoted as a real-time signal subsequence, and such subsequence will be used as a basis of cavitation warning later.

S12, each acoustic signal subsequence $\theta_j$ (j=1, . . . , C) extracted in S11 is normalized to obtain a finally outputted acoustic signal subsequence $\theta'_j$, wherein a L1 norm can be adopted for normalization, and a formula is as follows:

$$\theta'_j = \frac{\theta_j}{\|\theta_j\|}$$

where $\|\cdot\|$ represents a norm of a matrix.

Hence, the sample data set $\varphi$ is normalized to $\varphi'=<\theta_1', \theta_2', \ldots, \theta'_C>$, wherein $\theta'_C$ represents a normalized acoustic signal subsequence and will participate in the follow-up warning process.

There is a certain unsteady period after the hydraulic turbine set is started, and the working condition gradually tends to be steady later. Therefore, the purpose of extracting the acoustic signal subsequences is to form a series of samples at different periods in the operation process of the hydraulic turbine set, and such samples represent changes of acoustic signal data under different working conditions. However, the incipient cavitation for warning in the present invention occurs in the follow-up stage after the steady working condition. Therefore, it is necessary to first identify whether the hydraulic turbine set has entered the steady working condition. Such identification function is realized through follow-up clustering.

S2, the acoustic signal subsequences of all measuring points obtained in S1 are inputted into a SOM neural network, the acoustic signal subsequences are clustered into multiple clusters according to the corresponding operating condition of the hydraulic turbine set, and then the clusters are divided into a steady-state cluster and an unsteady-state cluster according to a signal fluctuation degree of the acoustic signal subsequences in each cluster.

SOM, as an unsupervised learning algorithm for clustering and high-dimensional visualization, is an artificial neural network developed by simulating the characteristics of human brain in signal processing. In the process of clustering, the SOM will classify data according to data features without specifying cluster categories in advance. Therefore, the SOM neural network is used for unsupervised learning clustering in the present invention. In such example, the specific implementation method of S2 includes the following steps:

S21, the acoustic signal subsequences of all measuring points obtained in S1 are inputted as an input layer of the SOM neural network, so that the inputted acoustic signal subsequences are divided into different clusters through unsupervised learning clustering.

The SOM algorithm belongs to the prior art, and includes the following general process: initialization, competition, cooperation, adaptation and iteration. The implementation process is briefly described below, but it should be noted that this is only for ease of understanding, rather than serving as a specific limitation to the present invention. The SOM algorithm includes the following process:

1) the normalized $\varphi=<\theta_1, \theta_2, \ldots, \theta_C>$ is used as an input layer of the SOM neural network;
2) weight vectors are initialized with a minimum random value to obtain a weight vector $W_j$ of each neuron, wherein j represents the jth neuron, j=1, 2, 3, . . . , J, and J represents a total number of neurons; then the weight vectors $W_j$ are normalized to obtain a normalized weight vector $W'_j$;
3) an initial learning rate $\eta(t)$ is set as $\eta(0)$;
4) a Euclidean distance of each neuron $N_j(t)$ node is calculated, and a node with a minimum distance is selected as a winning node; $N_{j*}(t)$ is defined as a winning neuron, j* represents a serial number where the winning neuron is located, and t represents a number of iterations (an initial value is 0); a winning neuron is denoted as 1, a non-winning neuron is denoted as 0, and weights of all nodes in $N_{j*}(t)$ are updated according to a gradient descent method; and
5) the learning rate $\eta(t)$ and the winning neuron are updated; when the number of iterations t exceeds a set number of iterations K, the cycle ends; otherwise, the number of iterations is set as t+1, and the process skips to 4).

S22, for each cluster clustered in S21, multiple statistical values of data points in each acoustic signal subsequence are calculated, and then a deviation of each statistical value of different acoustic signal subsequences in the same cluster is calculated; if the deviation of each statistical value corresponding to one cluster is less than the respective deviation threshold, such cluster is marked as a steady-state cluster; otherwise, such cluster is marked as an unsteady-state cluster.

It should be noted that the above-mentioned statistical values can be any statistic that reflects data fluctuations, such as mean value, maximum value, minimum value and median, or a combination of some. Moreover, the corresponding statistical values will be calculated from each acoustic signal subsequence based on the sampling point data therein, and deviations of such statistical values can reflect a fluctuation of different acoustic signal subsequences in a cluster. In such example, the adopted multiple statistical values include the mean value, maximum value, minimum value and median of the data points in the acoustic signal subsequences, and the deviations of such statistical values are variances between statistical values. For example, for a cluster, it is assumed that there are q acoustic signal subsequences, then a mean value, a maximum value, a minimum value and a median are calculated respectively from each acoustic signal subsequence, and then a variance of the mean values of such q acoustic signal subsequences, a variance of the maximum values of such q acoustic signal subsequences, a variance of the minimum values of such q acoustic signal subsequences, and a variance of the medians of such q acoustic signal subsequences are calculated respectively; it is assumed that such four variances are less than the respective variance thresholds of such four statistical values, such cluster is considered a steady-state cluster; if the variance of any statistical value exceeds the threshold, such cluster is considered an unsteady-state cluster. Besides, the variance threshold of each statistical value can be determined by statistical analysis based on historical data.

S3, distribution of the real-time signal subsequences $\theta'_C$ of all measuring points in the clusters is traversed; if a number $\theta'_C$ of the real-time signal subsequences contained in the steady-state cluster is not lower than a minimum number threshold, it is judged that the hydraulic turbine set is in a steady condition and incipient cavitation warning proceeds according to S4-S8; otherwise, it indicates that the hydraulic turbine set is not in a steady condition, and it is meaningless to perform cavitation warning at this time, so the current incipient cavitation warning process is interrupted, and a next incipient cavitation warning can be performed after new data are generated.

It should be noted that such minimum number threshold $I_T$ depends on a number of measuring points. If a total number I of measuring points is low, $I_T$ should be as close to I as possible, namely, all measuring points should be in a steady condition as far as possible to satisfy the data requirements of follow-up prediction. If the total number I of measuring points is high, $I_T$ is just a certain percentage of I. In such example, if the total number I of measuring points is less than 10, the minimum number threshold is $I_T=I$; if the total number I of measuring points is not less than 10, the minimum number threshold is $I_T=0.8I$.

The specific implementation form of follow-up S4-S8 in the incipient cavitation warning process of the present invention is described below.

S4, feature screening is performed on the real-time signal subsequences contained in the steady-state cluster by a RF algorithm, and optimal feature measuring points which can sensitively reflect changes in the operating condition of the hydraulic turbine set and optimal feature subsets of each optimal feature measuring point are extracted.

The RF algorithm is a highly flexible machine learning algorithm which can evaluate the importance of each feature in the classification. Not all sequence samples in the real-time signal subsequences contained in the steady-state cluster have great influence on the final cavitation warning of the hydraulic turbine. Therefore, it is necessary to perform screening on the sequence samples to obtain features which can sensitively reflect changes in the operating condition of the hydraulic turbine set, and such method includes two steps: the first step is screening on the measuring points, and for the sake of description, the screened measuring points are called optimal feature measuring points; the second step is screening on feature subsets in the optimal feature measuring points, and for the sake of description as well, the screened feature subsets in the optimal feature measuring points are called optimal feature subsets.

In such example, the specific implementation method of S4 includes the following steps:

S41, a disturbance (for distinguishing, such disturbance is denoted as a first disturbance; refer to RF algorithm for a specific disturbance method, which will not be repeated herein) is performed on each real-time signal subsequence contained in the steady-state cluster based on a RF algorithm, and a feature importance index $\Psi_k$ of each corresponding measuring point is calculated according to the results before and after the disturbance, wherein a calculation formula is as follows:

$$\Psi_k = \frac{1}{B}\sum_{b=1}^{B}(R_b^{oob} - R_{bk}^{oob})$$

where B represents a number of RF training samples, i.e., a total number of the real-time signal subsequences contained in the steady-state cluster, $R_b^{oob}$ represents a number of correctly classified OOB data of a decision-making tree before the first disturbance is performed on the bth real-time signal subsequence, and $R_{bk}^{oob}$ represents a number of correctly classified OOB data of a decision-making tree after the first disturbance is performed on the bth real-time signal subsequence.

S42, each real-time signal subsequence in the steady-state cluster corresponds to a measuring point, so the importance of the measuring points is ranked based on the feature importance index $\Psi_k$ of each measuring point obtained in S41, and the smaller the $\Psi_k$, the more important the measuring points; part of the most important measuring points are screened from the measuring points corresponding to all real-time signal subsequences in the steady-state cluster, used as optimal feature measuring points and can sensitively reflect changes in the operating condition of the hydraulic turbine set. The specific screening method can be referred to the RF algorithm and will not be expanded. A number of the optimal feature measuring points extracted in such step is denoted as P.

S43, for each optimal feature measuring point, its corresponding real-time signal subsequence is subjected to EMD to obtain n feature subsets $MF_1$-$MF_n$ (n represents a total number of feature subsets, and different optimal feature measuring points have the same n); then a disturbance (for distinguishing, such disturbance is denoted as a second disturbance; refer to the RF algorithm for is specific disturbance method, which will not be repeated herein) is performed on each feature subset based on the RF algorithm as well, and a feature importance index $\Psi_{k1}$ of each corresponding feature subset is calculated according to the results before and after the disturbance, wherein a calculation formula is as follows:

$$\Psi_{k1} = \frac{1}{B'}\sum_{b'=1}^{B'}(R_{b'}^{\prime oob} - R_{b'k}^{\prime oob})$$

where B' represents a number of RF training samples, i.e., a number of feature subsets of each optimal feature measuring point, $R_{b'}^{\prime oob}$ represents a number of correctly classified OOB data of a decision-making tree before the second disturbance is performed on the b'th feature subset, and $R_{b'k}^{\prime oob}$ represents a number of correctly classified OOB data of a decision-making tree after the second disturbance is performed on the b'th feature subset.

S44, the importance of the feature subsets is ranked based on the feature importance index $\Psi_{k1}$ of each feature subset obtained in S43, and the smaller the $\Psi_{k1}$, the more important the feature subsets; part of the most important feature subsets are screened from all feature subsets of each optimal feature measuring point, used as optimal feature subsets which can sensitively reflect changes in the operating condition of the hydraulic turbine set. It should be noted that the optimal feature subsets screened from different optimal measuring points should have an equal number of feature subsets.

S5, the optimal feature subsets of each optimal feature measuring point are normalized and information entropy is calculated, and with the information entropy as an input, a future trend of the hydraulic turbine set in a healthy state is predicted by using a health state prediction model constructed based on multilayer GRUs to obtain predictive information entropy of the acoustic signal of each optimal feature measuring point in the next predictive step.

In such example, the implementation method of S5 includes the following steps:

S51, for any pth optimal feature measuring point, its optimal feature subsets are combined to form a signal sequence $X'[x_{p,1}, x_{p,2}, \ldots, x_{p,r}, \ldots, x_{p,R}]$ with a length R after the feature extraction, the signal sequence X' is normalized to obtain a signal sequence $Y'=[y'_{p,1}, y'_{p,2}, \ldots, y'_{p,R}]$, and then information entropy $y_{p,R}$ of the normalized signal sequence Y' is calculated:

$$y_{p,R} = -\sum_{r=1}^{R} y'_{p,r} lg(y'_{p,r})$$

S52, a health state prediction model composed of multi-layer GRUs is constructed and trained, wherein each GRU is corresponding to an optimal feature measuring point, configured to predict a future trend of acoustic signal sequence information entropy at a corresponding optimal feature measuring point when the hydraulic turbine set is in a healthy condition without cavitation; and S53, the information entropy $y_{p,R}$ of each optimal feature measuring point calculated in S51 is inputted into the corresponding GRU in the health state prediction model successively, wherein the GRU outputs predictive information entropy $y_{p,h}$ of the acoustic signal of the corresponding optimal feature measuring point in the next time step h to be predicted.

The GRU is a kind of Recurrent Neural Network (RNN), which is proposed to solve the problems of gradient, etc. in long-term memory and back propagation. A GRU model has two gates, i.e., update gate and reset gate. The prediction process in the GRU belongs to the prior art, and is described as follows for ease of understanding:

First, the information entropy $y_{p,R}$ is inputted as an initial input set of GRU, and an update gate $\xi_{hh}$ is calculated by the following formula:

$\xi_h = \sigma(\Phi^{(\xi)}h + U^{(\xi)}y_{p,(h-1)})$ where $y_{p,h-1}$ stores the data information of a previous time step (h−1), h represents a next time step to be predicted, σ represents a Sigmoid activation function, and $\Phi^{(\xi)}$ and $U^{(\xi)}$ respectively represent a weight matrix inputted to the update gate $\xi_h$ and a weight matrix hidden to the update gate $\xi_h$ in the previous time step.

Then, a reset gate $\gamma_h$ is calculated by the following formula:

$\gamma_h = \sigma(\Phi^{(\gamma)}h + U^{(\gamma)}y_{p,h-1})$ where $\Phi^{(\gamma)}$ and $U^{(\gamma)}$ respectively represent a weight matrix inputted to the reset gate $\gamma_h$ and a weight matrix hidden to the reset gate $y_h$ in the previous time step (h−1); in the update gate and reset gate, both h and $y_{p,h-1}$ are multiplied by the weight matrixes, and $\Phi^{(\gamma)}h + U^{(\gamma)}y_{p,h-1}$ are added and then multiplied by the Sigmoid activation function to realize normalized compression of the activation result.

Then, a new memory content $y'_{p,h}$ will use the reset gate to store the related previous information, with a calculation formula as follows:

$y_{ph}' = \tan h(\Phi^{(\gamma)}h + \gamma_h \odot U^{(\gamma)} y_{p,h-1})$

A Hadamard product of the reset gate $\gamma_h$ and $U^{(\gamma)}y_{p,h-1}$ is calculated to determine the previous information to retain and forget.

Finally, the network needs to calculate the data information of the time step h stored by $y_{p,h}$, and such vector will retain information of the current unit and pass it on to the next unit; the update gate is used; the update gate decides the current memory content $y'_{p,h}$ and the information to be collected in the previous time step $y_{p,h-1}$, wherein $y_{p,h}$ is calculated by the following formula:

$y_{p,h} = \xi_n \odot y_{p,(h-1)} + (1-\xi_n) \odot y_{p,h}'$

It should be noted that the health state prediction model needs to be trained in advance, so that each GRU can accurately predict the information entropy $y_{p,h}$ in the next time step h based on the information entropy $y_{p,R}$. During training, an Adam algorithm is adopted to adaptively and dynamically adjust a model learning rate, a mean absolute percentage error is minimized as a target loss function, and a result is calculated based on the target loss function to detect whether the GRU model accuracy reaches the requirements. If the requirements are reached, the training is completed; otherwise, optimizing is continued.

S6, acoustic signal time sequence data actually acquired from each optimal feature measuring point on the hydraulic turbine set is obtained in the next predictive step h and actual information entropy $\hat{y}_{p,h}$ is calculated, and a dynamic tolerance $\Delta y_{p,h}$ of each optimal feature measuring point is calculated from the predictive information entropy $y_{p,h}$ and the actual information entropy $\hat{y}_{p,k}$. For any pth optimal feature measuring point, its dynamic tolerance $\Delta y_{p,h}$ is calculated by the following formula:

$$\Delta y_{p,h} = \left| \frac{\hat{y}_{p,h} - y_{p,h}}{y_{p,h}} \right| \times 100\%$$

where $\hat{y}_{p,h}$ represents actual information entropy of the acoustic signal time sequence data actually acquired from the pth optimal feature measuring point in the time step h.

It should be noted that the predictive information entropy $y_{p,h}$ actually represents the information entropy corresponding to normal acoustic signals in the predictive step h when the hydraulic turbine set is in a healthy operating condition without cavitation. Moreover, $\hat{y}_{p,h}$ represents the information entropy corresponding to the acoustic signals in the predictive step h when the current hydraulic turbine set is in an actual operating condition. At this time, it is unknown whether the incipient cavitation occurs to the hydraulic turbine set, but whether the incipient cavitation occurs will affect $\hat{y}_{p,h}$ and change the dynamic tolerance $\Delta y_{p,h}$. Therefore, whether the incipient cavitation occurs can be further judged according to the dynamic tolerance $\Delta y_{p,h}$ later.

S7, based on the current output condition of the hydraulic turbine set, acoustic signal information entropy $\bar{y}_{p,h}$ (with incipient cavitation present) of the hydraulic turbine set in the next predictive step h is predicted by using the pre-constructed SOM network, and a dynamic tolerance alarm threshold $\Delta \bar{y}_{p,h}$ of each optimal feature measuring point is calculated by the predictive information entropy $y_{p,h}$ and the acoustic signal information entropy $\bar{y}_{p,h}$ (with incipient cavitation present). Hence, the dynamic tolerance alarm threshold $\Delta \bar{y}_{p,h}$ actually represents a value corresponding to the dynamic tolerance when incipient cavitation occurs to the hydraulic turbine set. Based on such threshold, the existence of incipient cavitation can be inferred.

In such example, the specific implementation method of S7 includes the following steps:

S71, based on the SOM network, a multi-dimensional mapping network between the acoustic signal time-frequency feature of the measuring points and the cavitation state of the hydraulic turbine set under different output conditions is constructed, wherein such acoustic signal time-frequency feature is its information entropy; such multi-dimensional mapping network can be trained by historical data, so that it can accurately predict the corresponding information entropy according to the output condition of the hydraulic turbine set.

S72, the current output condition of the hydraulic turbine set is determined, and then acoustic signal information entropy $\bar{y}_{p,h}$ (with incipient cavitation present) of the optimal feature measuring points in the hydraulic turbine set in the time step h is predicted by using the trained multi-dimensional mapping network; and S73, a dynamic tolerance alarm threshold $\Delta\bar{y}_{p,h}$ is calculated according to the acoustic signal information entropy $\bar{y}_{p,h}$ and the predictive information entropy $y_{p,h}$ of each optimal feature measuring point, wherein a calculation formula is as follows:

$$\Delta\bar{y}_{p,h} = \left|\frac{\bar{y}_{p,h} - y_{p,h}}{y_{p,h}}\right| \times 100\%.$$

Through the adaptive coupling data, the dynamic tolerances and the dynamic tolerance alarm thresholds of multiple measuring points are evaluated, which can be used to judge whether the incipient cavitation occurs to the equipment later.

S8, a sum of the dynamic tolerances of all optimal feature measuring points is compared with a sum of the dynamic tolerance alarm thresholds, and whether the incipient cavitation occurred in the hydraulic turbine set is judged, wherein the judgment rule is based on the threshold method, namely, if the sum of the dynamic tolerances of all optimal feature measuring points exceeds the sum of the dynamic tolerance alarm thresholds of all optimal feature measuring points, the incipient cavitation occurs, incipient cavitation warning is given, and the real incipient cavitation data are stored for subsequent analysis; otherwise, the hydraulic turbine set is considered to be in a normal condition without incipient cavitation, and no incipient cavitation warning is given.

Figure 3:
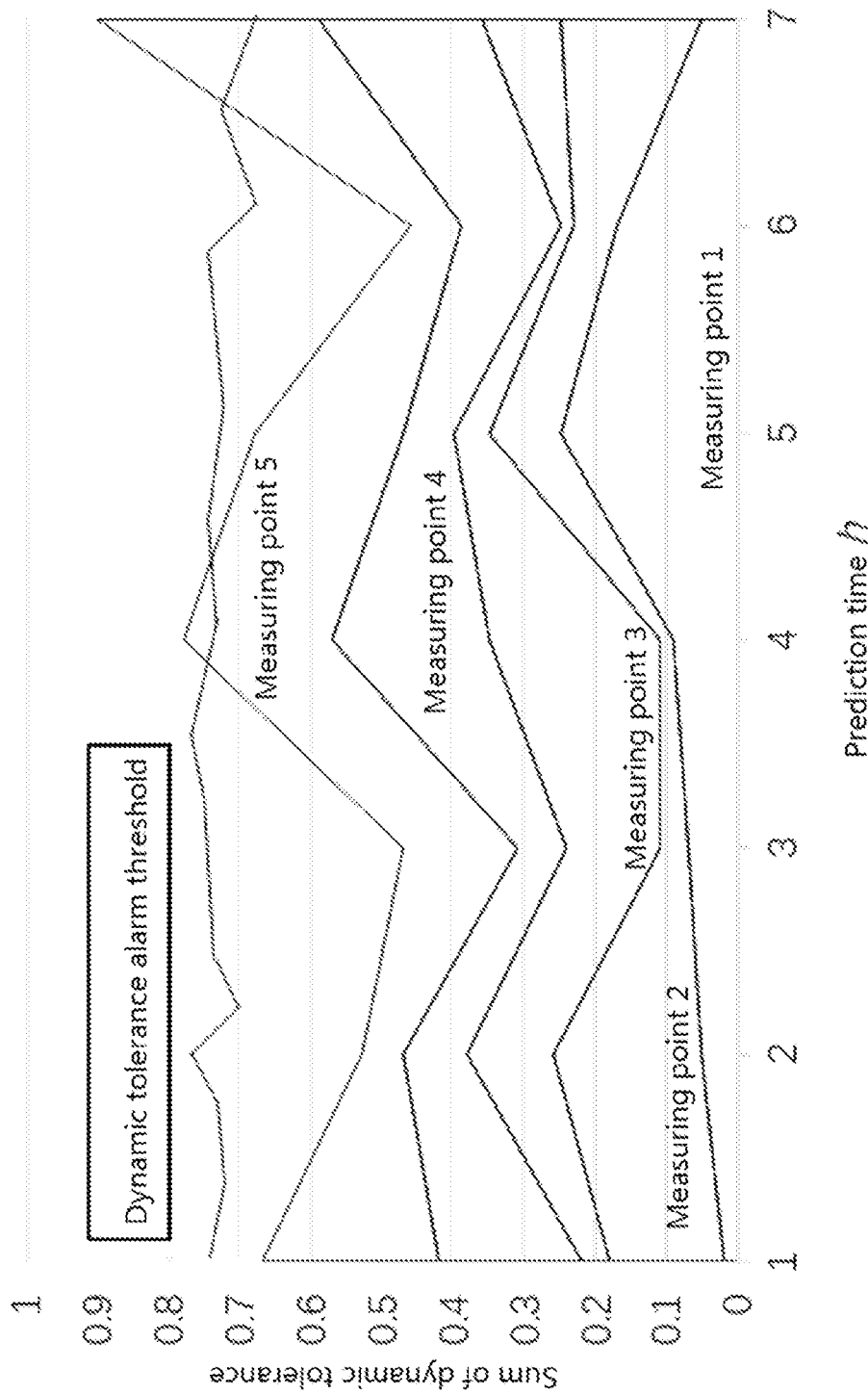
FIG. 3 is a stacked area chart of dynamic tolerances of multiple measuring points.

As the data of multiple optimal feature measuring points need to be added and compared in such step, an analytical method of stacked area chart can be introduced for comparative analysis in order to facilitate analysis and visual display. As shown in FIG. 3, as an example, the dynamic tolerances of all the monitored measuring points in the time sequence can be mapped to a two-dimensional coordinate space, and the dynamic tolerances of all measuring points can be accumulated to obtain a change curve of overall dynamic tolerances of the hydraulic turbine set over time; similarly, the dynamic tolerance alarm thresholds can be mapped to the two-dimensional coordinate space as well, and the dynamic tolerance alarm thresholds of all measuring points can be accumulated to obtain a change curve of overall dynamic tolerance alarm thresholds of the hydraulic turbine set over time. The judgment can be completed by intuitively observing the two change curves in the two-dimensional coordinate space. With five measuring points in FIG. 3 as an example, in the position of h=4, the curve of overall dynamic tolerances exceeds the curve of overall dynamic tolerance alarm thresholds, indicating that the incipient cavitation occurs.

The process of S1-S8 can be deemed as a round of incipient cavitation warning process. The next round of incipient cavitation warning can be performed when new data appear at each measuring point.

The hydraulic turbine cavitation acoustic Signal identification method shown as S1-S8 is applied to a specific example below to demonstrate its technical effects. The specific procedure of such method in the following example is described above and will not be repeated herein. The specific implementation details and technical effects are mainly demonstrated below.

EXAMPLE

In the example, a signal detection was performed on a cavitation process of an axial-flow hydraulic turbine under the conditions of maximum head and maximum output through a detection platform. As the cavitation usually occurs at a rotating wheel of the axial-flow hydraulic turbine, four measuring points were installed at a blade leading edge on an outer wall of the rotating wheel, a blade center line, a blade trailing edge and an inlet of an exhaust water pipe to acquire transient acoustic signals, and such signals to form acoustic signal sequence data for warning were recorded in real time.

A relative efficiency $\eta'$ of the hydraulic turbine is defined by the following formula:

$$\eta' = \frac{\eta}{\eta_{Max}}$$

where $\eta_{Max}$ represents an efficiency value corresponding to a maximum cavitation coefficient, and $\eta$ represents a measurement efficiency value.

Figure 4:
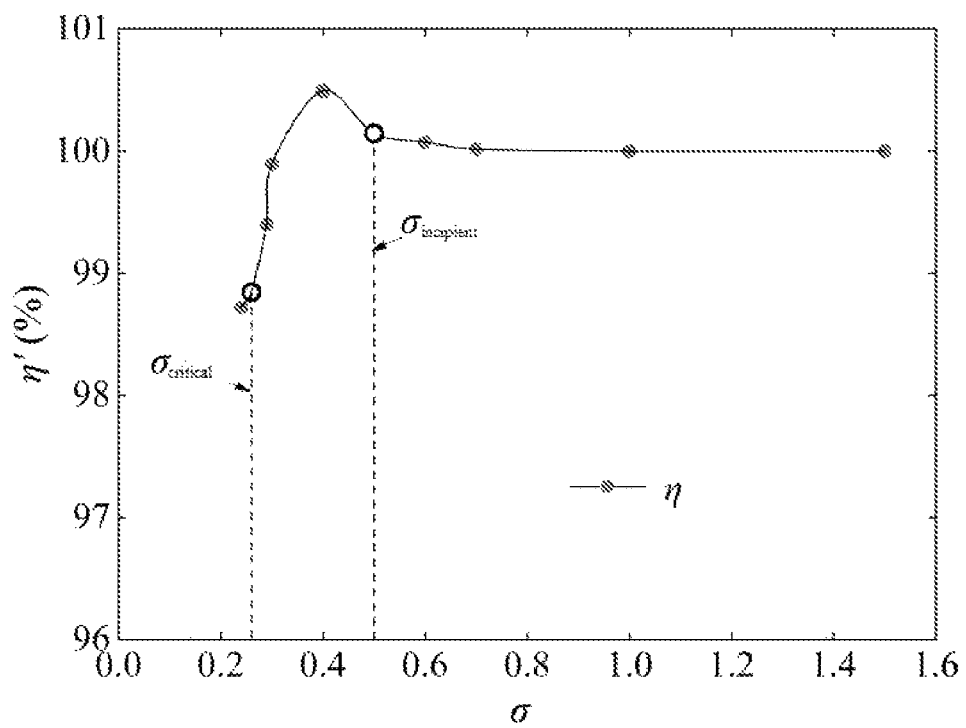
FIG. 4 is a curve profile of cavitation coefficient-relative efficiency ($\sigma$-$\eta'$).

A curve of cavitation coefficient-relative efficiency ($\sigma$-$\eta'$) for test under such condition is as shown in FIG. 4. In the figure, $\sigma_{incipient}$ represents an initial cavitation coefficient, and at this time, the cavitation is visible by naked-eye observation for the first time; $\sigma_{critical}$ represents a critical cavitation coefficient, and at this time, the efficiency drops by more than 1%. Therefore, in such example, the acoustic signal sequence data obtained under such condition were used for the incipient cavitation warning, and whether the method of the present invention can give sensitive warning for the cavitation was judged.

The specific incipient cavitation warning process was described in S1-S8, wherein the SOM neural network was adopted for time sequence clustering. During extraction of the steady-state operating data, because only four measuring points were arranged in the test, feature subsets were directly screened. By measuring the importance index of feature subsets, the feature subsets were ranked to select two feature subsets (marked as feature subset 1 and feature subset 2) that can sensitively reflect changes in the operating condition of the hydraulic turbine set as optimal feature subsets for subsequent analysis. The information entropy of the feature subset 1 and feature subset 2 of each measuring point was extracted at a cavitation coefficient of 0.6-1.5, and the feature value information entropy of each measuring point was predicted at a cavitation coefficient of 0.24-0.6. The results are as shown in Table 1.

TABLE 1

Information Entropy of Each Measuring Point

| σ | 0.24 | 0.26 | 0.29 | 0.3 | 0.4 | 0.5 | 0.6 | 0.7 | 1 | 1.5 |
|---|---|---|---|---|---|---|---|---|---|---|
| P1 | (6.51, 6.23) | (6.37, 6.33) | (5.47, 6.96) | (5.47, 6.84) | (5.87, 6.56) | (5.90, 6.75) | (5.76, 6.21) | (5.31, 6.79) | (5.02, 6.76) | (4.51, 5.76) |
| P2 | (7.58, 6.39) | (7.05, 6.48) | (−5.95, 6.18) | (6.73, 6.79) | (6.95, 6.43) | (6.64, 6.50) | (6.85, 6.17) | (5.81, 6.87) | (5.67, 6.92) | (5.29, 6.36) |
| P3 | (6.78, 6.82) | (6.39, 6.69) | (6.51, 6.09) | (6.08, 6.28) | (6.23, 6.41) | (6.66, 6.77) | (6.14, 6.52) | (5.17, 6.06) | (5.34, 6.13) | (4.34, 6.15) |
| P4 | (6.44, 6.43) | (6.36, 6.42) | (6.54, 6.82) | (5.54, 6.82) | (6.45, 6.34) | (6.81, 7.01) | (6.21, 6.58) | (5.49, 6.65) | (5.12, 5.95) | (4.98, 5.49) |

Figure 5:
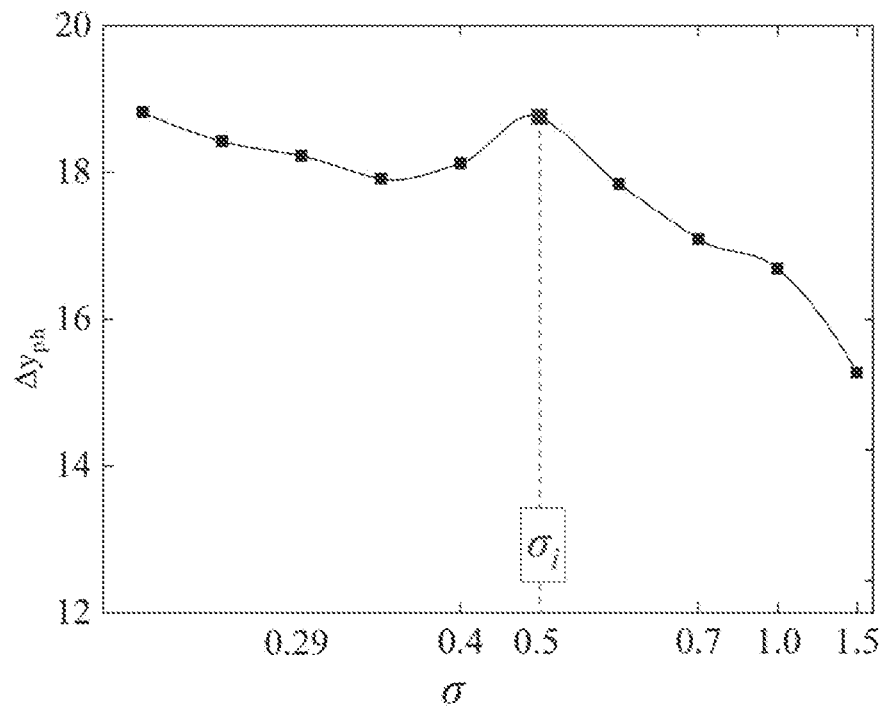
FIG. 5 is a change curve profile of overall dynamic tolerances.

Finally, through the threshold method, a sum of the dynamic tolerances of the four measuring points was compared with a sum of the dynamic tolerance alarm thresholds to judge whether the incipient cavitation occurs to the equipment. As shown in FIG. 5, the results show that the sum of the dynamic tolerances increased dramatically when incipient cavitation occurred ($\sigma_i=0.5$), exceeding the sum of the dynamic tolerance alarm thresholds, and triggering a cavitation warning alert, consistent with FIG. 4. It indicates that the incipient cavitation warning method provided by the present invention can find the cavitation in the working hydroelectric equipment timely through acoustic signals.

The above-mentioned embodiments are only used for describing the technical solutions of the present invention, rather than limiting. Although the present invention is described in detail by reference to the above-mentioned embodiments, those of ordinary skill in the art should understand that they can still make modifications to the technical solutions recorded in the above-mentioned embodiments, or make equivalent substitutions to a part of or all technical characteristics thereof; moreover, these modifications or substitutions will not make the corresponding technical solutions depart from the scope of the technical solutions in the embodiments of the present invention.

The invention claimed is:

1. A hydraulic turbine cavitation acoustic signal identification method based on big data learning, comprising the following steps:
   S1, obtaining latest acoustic signal time sequence data of each measuring point in real time through measuring points arranged on a hydraulic turbine set, and partitioning the acoustic signal time sequence data of each measuring point into multiple normalized acoustic signal subsequences, wherein a latest recorded acoustic signal subsequence of each measuring point is used as a real-time signal subsequence;
   S2, inputting the multiple normalized acoustic signal subsequences of all measuring points obtained in S1 into a self-organizing maps (SOM) neural network, clustering the multiple normalized acoustic signal subsequences into multiple clusters according to a corresponding operating condition of the hydraulic turbine set, and then dividing each of the multiple clusters into a steady-state cluster and an unsteady-state cluster according to a signal fluctuation degree of the multiple normalized acoustic signal subsequences in each of the multiple clusters;
   S3, traversing distribution of the real-time signal subsequences of all measuring points in the multiple clusters; if a number of the real-time signal subsequences contained in the steady-state cluster is not lower than a minimum number threshold, it is judged that the hydraulic turbine is in a steady condition and an incipient cavitation warning process proceeds according to S4-S8; otherwise, the current incipient cavitation warning process is interrupted;
   S4, performing feature screening on the real-time signal subsequences contained in the steady-state cluster by a random forest (RF) algorithm, and extracting optimal feature measuring points which can sensitively reflect changes in the corresponding operating condition of the hydraulic turbine set and optimal feature subsets of each of the optimal feature measuring points;
   S5, normalizing the optimal feature subsets of each of the optimal feature measuring points and calculating information entropy, and with the information entropy as an input, predicting a future trend of the hydraulic turbine set in a healthy state by using a health state prediction model constructed based on multilayer gate recurrent units (GRUs) to obtain predictive information entropy of the acoustic signal of each of the optimal feature measuring points in a next predictive step;
   S6, obtaining acoustic signal time sequence data actually acquired from each of the optimal feature measuring points on the hydraulic turbine set in the next predictive step and calculating actual information entropy, and calculating a dynamic tolerance of each of the optimal feature measuring points from the predictive information entropy and the actual information entropy;
   S7, based on a current output condition of the hydraulic turbine set, obtaining acoustic signal information entropy with incipient cavitation present) of the hydraulic turbine set in the next predictive step through prediction using a pre-constructed SOM network, and calculating a dynamic tolerance alarm threshold of each of the optimal feature measuring points from the predictive information entropy and the acoustic signal information entropy with the incipient cavitation present; and
   S8, comparing a sum of the dynamic tolerances of all the optimal feature measuring points with a sum of the dynamic tolerance alarm thresholds based on a threshold method, and judging whether the incipient cavitation occurs to the hydraulic turbine set; if yes, an incipient cavitation warning is given; otherwise, no incipient cavitation warning is given.

2. The hydraulic turbine cavitation acoustic signal identification method of claim 1, wherein in S1, the method of partitioning the acoustic signal time sequence data of each measuring point into multiple acoustic signal subsequences comprises the following steps:
   S11, performing fixed-step sliding through a fixed-sized time window on the latest acoustic signal time sequence data of each measuring point, and extracting acoustic signal subsequences from the time window every time one step is slided by; and
   S12, normalizing each of the acoustic signal subsequences extracted in S11 to obtain the finally outputted multiple normalized acoustic signal subsequences.

3. The hydraulic turbine cavitation acoustic signal identification method of claim 1, wherein the implementation method of S2 comprises the following steps:

S21, inputting the multiple normalized acoustic signal subsequences of all measuring points obtained in S1 as an input layer of the SOM neural network, so that the inputted multiple normalized acoustic signal subsequences are divided into different clusters through unsupervised learning clustering; and S22, for each of the clusters clustered in S21, calculating multiple statistical values of data points in each of the multiple normalized acoustic signal subsequences, and then calculating a deviation of each of the statistical values of the different normalized acoustic signal subsequences in the same cluster; if the deviation of each of the statistical values corresponding to one cluster is less than a respective deviation threshold, such cluster is marked as the steady-state cluster; otherwise, such cluster is marked the unsteady-state cluster.

4. The hydraulic turbine cavitation acoustic signal identification method of claim 3, wherein the multiple statistical values comprise the mean value, maximum value, minimum value and median of the data points in the multiple normalized acoustic signal subsequences, and the deviation is a variance.

5. The hydraulic turbine cavitation acoustic signal identification method of claim 1, wherein the implementation method of S4 comprises the following steps:

S41, performing a first disturbance on each real-time signal subsequence contained in the steady-state cluster based on a RF algorithm, and calculating a feature importance index $\Psi_k$ of each corresponding measuring point according to the results before and after the disturbance, wherein a calculation formula is as follows:

$$\Psi_k = \frac{1}{B}\sum_{b=1}^{B}\left(R_b^{oob} - R_{bk}^{oob}\right)$$

where B represents a total number of the real-time signal subsequences contained in the steady-state cluster, $R_b^{oob}$ represents a number of correctly classified out-of-bag (OOB) data of a decision-making tree before the first disturbance is performed on the bth real-time signal subsequence, and $R_{bk}^{oob}$ represents a number of correctly classified OOB data of a decision-making tree after the first disturbance is performed on the bth real-time signal subsequence;

S42, based on the feature importance index of each measuring point obtained in S41, screening the optimal feature measuring points which can sensitively reflect the changes in the corresponding operating condition of the hydraulic turbine set from the measuring points corresponding to all real-time signal subsequences in the steady-state cluster;

S43, for each of the optimal feature measuring points, performing empirical mode decomposition (EMD) on a corresponding real-time signal subsequence to obtain feature subsets in equal quantities, and then performing a second disturbance on each of the feature subsets based on the RF algorithm, and calculating a feature importance index $\Psi_{k1}$ of each of the feature subsets according to the results before and after the disturbance, wherein a calculation formula is as follows:

$$\Psi_{k1} = \frac{1}{B'}\sum_{b'=1}^{B'}\left(R_{b'}^{'oob} - R_{b'k}^{'oob}\right)$$

where B' represents a number of the feature subsets of each of the optimal feature measuring points, $R_{b'}^{'oob}$ represents a number of correctly classified OOB data of a decision-making tree before the second disturbance is performed on a b'th feature subset, and $b_{b'k}^{'oob}$ represents a number of correctly classified OOB data of a decision-making tree after the second disturbance is performed on the b'th feature subset;

S44, based on the feature importance index of each of the feature subsets obtained in S43, screening the optimal feature subsets in equal quantities which can sensitively reflect the changes in the corresponding operating condition of the hydraulic turbine set from the feature subsets of each of the optimal feature measuring points.

6. The hydraulic turbine cavitation acoustic signal identification method of claim 1, wherein the implementation method of S5 comprises the following steps:

S51, for any pth optimal feature measuring point, combining its optimal feature subsets to form a signal sequence $X'=[x_{p,1}, x_{p,2}, \ldots, x_{p,r}, \ldots, x_{p,R}]$ with a length R after extracting the optimal feature measuring points which can sensitively reflect the changes in the the corresponding operating condition of the hydraulic turbine set and the optimal feature subsets of each of the optimal feature measuring points, normalizing the signal sequence X' to obtain a signal sequence $Y'=[y'_{p,1}, y'_{p,2}, \ldots, y'_{p,R}]$, and then calculating information entropy $y_{p,R}$ of the normalized signal sequence Y':

$$y_{p,R} = -\sum_{r=1}^{R} y'_{p,r} lg(y'_{p,r})$$

S52, constructing and training the health state prediction model composed of the multilayer GRUs, wherein each of the multilayer GRUs is corresponding to one of the optimal feature measuring points, configured to predict a future trend of acoustic signal sequence information entropy at a corresponding optimal feature measuring point when the hydraulic turbine set is in a health state without cavitation; and S53, inputting the information entropy $y_{p,R}$ of each of the optimal feature measuring points calculated in S51 into a corresponding GRU in the health state prediction model successively, wherein the corresponding GRU outputs predictive information entropy $y_{p,h}$ of the acoustic signal of the corresponding optimal feature measuring point in the next time step h to be predicted.

7. The hydraulic turbine cavitation acoustic signal identification method of claim 6, wherein in S6, for any pth optimal feature measuring point, its dynamic tolerance $\Delta y_{p,h}$ is calculated by the following formula:

$$\Delta y_{p,h} = \left|\frac{\hat{y}_{p,h} - y_{p,h}}{y_{p,h}}\right| \times 100\%$$

where $\hat{y}_{p,h}$ represents actual information entropy of the acoustic signal time sequence data actually acquired from the pth optimal feature measuring point in the time step h.

8. The hydraulic turbine cavitation acoustic signal identification method of claim 6, wherein the implementation method of S7 comprises the following steps:

S71, based on the SOM network, constructing a multi-dimensional mapping network between the acoustic signal information entropy of the optimal feature measuring points and a cavitation state of the hydraulic turbine set under different output conditions;

S72, determining the current output condition of the hydraulic turbine set, and then predicting acoustic signal information entropy $\bar{y}_{p,h}$ with the incipient cavitation present of the optimal feature measuring points in the hydraulic turbine set in the time step h by using the multi-dimensional mapping network; and S73, calculating the dynamic tolerance alarm threshold $\Delta \bar{y}_{p,h}$ according to the acoustic signal information entropy $\bar{y}_{p,h}$ and the predictive information entropy $y_{p,h}$ of each of the optimal feature measuring points, wherein a calculation formula is as follows:

$$\Delta \bar{y}_{p,h} = \left| \frac{\bar{y}_{p,h} - y_{p,h}}{y_{p,h}} \right| \times 100\%.$$

9. The hydraulic turbine cavitation acoustic signal identification method of claim 1, wherein in S8, a comparative analysis is performed by an analytical method of stacked area chart.

10. The hydraulic turbine cavitation acoustic signal identification method of claim 1, wherein S1-S8 proceed iteratively according to a set step interval when the hydraulic turbine set is operating.

* * * * *